US009382951B2

(12) United States Patent
Reiner et al.

(10) Patent No.: US 9,382,951 B2
(45) Date of Patent: Jul. 5, 2016

(54) LOCKING HUB SYSTEM

(71) Applicant: Warn Industries, Inc., Clackamas, OR (US)

(72) Inventors: Adam K. Reiner, Wilsonville, OR (US); Kip E. Clohessy, Milwaukie, OR (US); Michael L. Bowers, Gresham, OR (US)

(73) Assignee: Warn Industries, Inc., Clackamas, OR (US)

( * ) Notice: Subject to any disclaimer, the term of this patent is extended or adjusted under 35 U.S.C. 154(b) by 0 days.

(21) Appl. No.: 14/479,117

(22) Filed: Sep. 5, 2014

(65) Prior Publication Data

US 2016/0069397 A1    Mar. 10, 2016

(51) Int. Cl.
*F16D 11/14*    (2006.01)
*F16H 48/30*    (2012.01)
*B60K 17/35*    (2006.01)

(52) U.S. Cl.
CPC .............. *F16D 11/14* (2013.01); *B60K 17/352* (2013.01); *B60K 17/3515* (2013.01)

(58) Field of Classification Search
CPC .......................... B60K 17/352; B60K 17/3515
USPC ...................................................... 192/69.43
See application file for complete search history.

(56) References Cited

U.S. PATENT DOCUMENTS

| | | | |
|---|---|---|---|
| 4,811,824 A * | 3/1989 | Kurihara ............ | B60K 17/3515 192/35 |
| 5,445,258 A | 8/1995 | Bigley et al. | |
| 5,520,272 A * | 5/1996 | Ewer ....................... | F16D 11/14 192/36 |
| 5,908,080 A | 6/1999 | Bigley et al. | |
| 7,000,750 B2 | 2/2006 | Ewer | |
| 7,055,667 B2 | 6/2006 | Roe et al. | |

OTHER PUBLICATIONS

Corporate Brochure, Warn Industries, Inc., Available as early as Feb. 2005, 9 pages.
Pulse Vacuum Locking Hub, Pulse Vacuum Locking Hub with Manual Override (PVH), WARN Industries, Inc. Product Sheet, Nov. 2006, 2 pages.
Super Duty 2011, Ford Motor Company Product Brochure, Available as early as May 2010, 28 pages.
Technology Overview, Warn Industries, Inc. Product Sheet, Oct. 2011, 1 page.
Fretz, Darren G. et al., "Hublock," Design Patent U.S. Appl. No. 29/448,677, filed Mar. 13, 2013, 6 pages.
Fretz, Darren G. et al., "Hublock," Design U.S. Appl. No. 29/448,687, filed Mar. 13, 2013, 4 pages.
Fretz, Darren G. et al., "Drive Flange Cap," Design U.S. Appl. No. 29/448,702, filed Mar. 13, 2013, 4 pages.

* cited by examiner

*Primary Examiner* — Robert Hodge
*Assistant Examiner* — Ryan Dodd
(74) *Attorney, Agent, or Firm* — Alleman Hall McCoy Russell & Tuttle LLP (57) ABSTRACT

A locking hub system in a vehicle is provided. The locking hub system includes an inner drive gear assembly including a drive gear having a drive gear interior splined surface configured to attach to a vehicle axle and a bearing housing rotationally coupled to the drive gear having a bearing housing exterior splined surface configured to mate with a wheel attachment interface and a clutch ring assembly including a pin ring having a plurality of cantilevered pins extending from a support ring, partially enclosing a clutch ring, and unsupported at one end, the clutch ring including a clutch ring splined interior surface slidably moveable to mate with an drive gear splined exterior surface of the drive gear in an engaged configuration and slidably moveable to decouple from the drive gear splined exterior surface in a disengaged configuration.

20 Claims, 8 Drawing Sheets

LOCKING HUB SYSTEM

FIELD

The invention relates to a locking hub system for a vehicle with improved installation, repair, and replacement characteristics.

BACKGROUND

Some vehicles employ four-wheel drive systems to increase traction for off-road driving as well as low traction on-road driving. However, it may be desirable to provide optional engagement/disengagement of the four-wheel drive system to increase the versatility of the vehicle. Specifically, two of the drive wheels may be disengaged to provide two-wheel drive during on-road driving to increase the vehicle's fuel economy. On the other hand, four-wheel drive may be used to provide increased traction during certain driving conditions, such as vehicle operation on dirt roads, snow, etc. In this way, a user may adjust a vehicle's drivetrain based on the driving circumstances and the desired vehicle performance characteristics.

Engagement of four-wheel drive systems may be automatically activated or manually activated. Although automatic four-wheel drive engagement has a number of benefits, such as decreased user interaction, automatic engagement four-wheel drive systems also may have some drawbacks, such as greater manufacturing cost as well as repair and maintenance costs. On the other hand, manually engaged four-wheel drive systems have certain benefits over automatically engaged system, such as increased reliability and decreased manufacturing and repair costs. Therefore, manual four-wheel drive systems may be desired by users who prefer less complex and more reliable four-wheel drive systems, such as off-road enthusiasts.

However, many manual locking hub systems do not achieve an adequate amount reliability and may break, necessitating repair. For instance, certain manual locking hub systems employ plastic components which are not durable and can break during off-road use, installation, and/or removal. Additionally, some systems employ a floating bearing housing which allows for movement and wear. Furthermore, it may be difficult to disassemble the manual locking hubs without the use of specialized tools due to the design of the hub lock, necessitating full replacement of the hub lock as opposed to replacement of only the broken parts in the hub lock.

SUMMARY

To overcome at least some of the aforementioned problems, a locking hub system has been developed. The locking hub system includes an inner drive gear assembly including a drive gear having a drive gear interior splined surface configured to attach to a vehicle axle and a bearing housing rotationally coupled to the drive gear having a bearing housing exterior splined surface configured to mate with a wheel attachment interface and a clutch ring assembly including a pin ring having a plurality of cantilevered pins extending from a support ring, partially enclosing a clutch ring, and unsupported at one end, the clutch ring including a clutch ring splined interior surface slidably moveable to mate with an drive gear splined exterior surface of the drive gear in an engaged configuration and slidably moveable to decouple from the drive gear splined exterior surface in a disengaged configuration. This type of locking hub system enables a user to easily remove and repair or replace components in the system without the use of special tools, if desired. Specifically, the unsupported ends of the pin ring enable the components enclosed by the pin ring to be easily removed during repair, replacement, and servicing. Moreover, the locking hub system with the aforementioned structural characteristics is highly modular, enabling a user to modify, replace, and/or customize the locking hub system. Additionally, providing the splined surface on the exterior of the bearing housing enables the bearing housing to act as an axial structural member of the system, thereby improving the system's durability.

Further in one example, an axial width of the bearing housing is greater than an axial width of the pin ring. Increasing the width of the bearing housing in this way enables the system to support greater radial loads from external components such as an axle, U-joint, wheel, etc., when compared to systems with narrower bearing housings. As a result, the durability of the system in improved. Moreover, when the width of the bearing housing is increased the likelihood of the system wearing into a wheel hub and becoming stuck, in some instances, is reduced. Consequently, the system may be more easily removed for servicing, repair, replacement, etc., when the width of the bearing housing is increased in this way.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Additionally, the above issues have been recognized by the inventors herein, and are not admitted to be known.

BRIEF DESCRIPTION OF THE DRAWINGS

FIGS. 2-9 are drawn approximately to scale, although other relative dimensions may be used.

DETAILED DESCRIPTION

Figure 1:
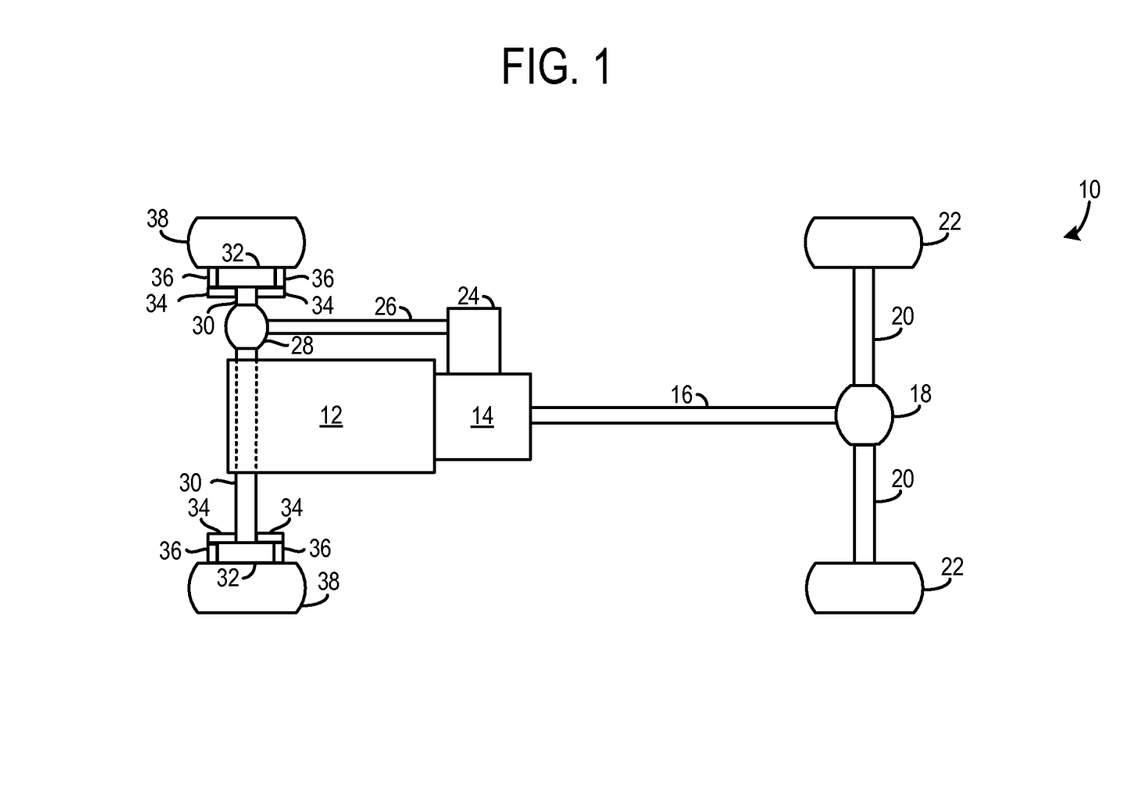
FIG. 1 shows a schematic depiction of a four-wheel drive vehicle including locking hub system for engaging/disengaging a portion of the drive wheels in the vehicle.

FIG. 1 shows a schematic illustration of a four-wheel drive vehicle 10. The vehicle 10 includes an internal combustion engine 12 configured to perform combustion cycles and generate a rotation output. The vehicle 10 further includes a transmission 14 coupled to the engine 12. The transmission is configured to receive the rotational output from the engine 12. The vehicle 10 further includes a propeller shaft 16 coupled to the transmission and receiving rotational input therefrom. The propeller shaft 16 rotates a differential 18. In turn the differential 18 rotates axles 20 coupled to a set of wheels 22 (e.g., rear wheels). Therefore, the propeller shaft 16 is coupled to the differential 18 and the differential is coupled to the axles 20. The set of wheels 22 may be referred to as drive wheels.

The vehicle 10 further includes a transfer case 24 coupled to the transmission 14 and configured to receive rotational output therefrom. The transfer case 24 rotates a second propeller shaft 26. The second propeller shaft 26 is coupled to a second differential 28 coupled to the axles 30 and transfer rotational input thereto. Each of the axles 30 are coupled to a locking hub system 32. Each of the locking hub systems 32 are rotationally coupled to the axles 30. The locking hub systems 32 are coupled to wheel bearings 34 and wheel attachment interfaces 36. The vehicle 10 further includes wheels 38 coupled to the wheel attachment interfaces 36. The wheel bearings 34, wheel attachment interfaces 36, and wheels 38 may be included in a wheel assembly.

The locking hub systems 32 are constructed to enable the wheels 38 to freely rotate in a disengaged configuration and constructed to enable rotational force to be transferred from the axles 30 to the wheels 38 in an engaged configuration. In this way, a second set of wheels may be enabled and disabled as drive wheels, providing optional two-wheel drive and four-wheel drive configurations in the vehicle 10. It will be appreciated that the locking hub systems 32 may be manually actuated to reconfigure the systems in the engaged configuration and disengaged configuration.

Figure 2:
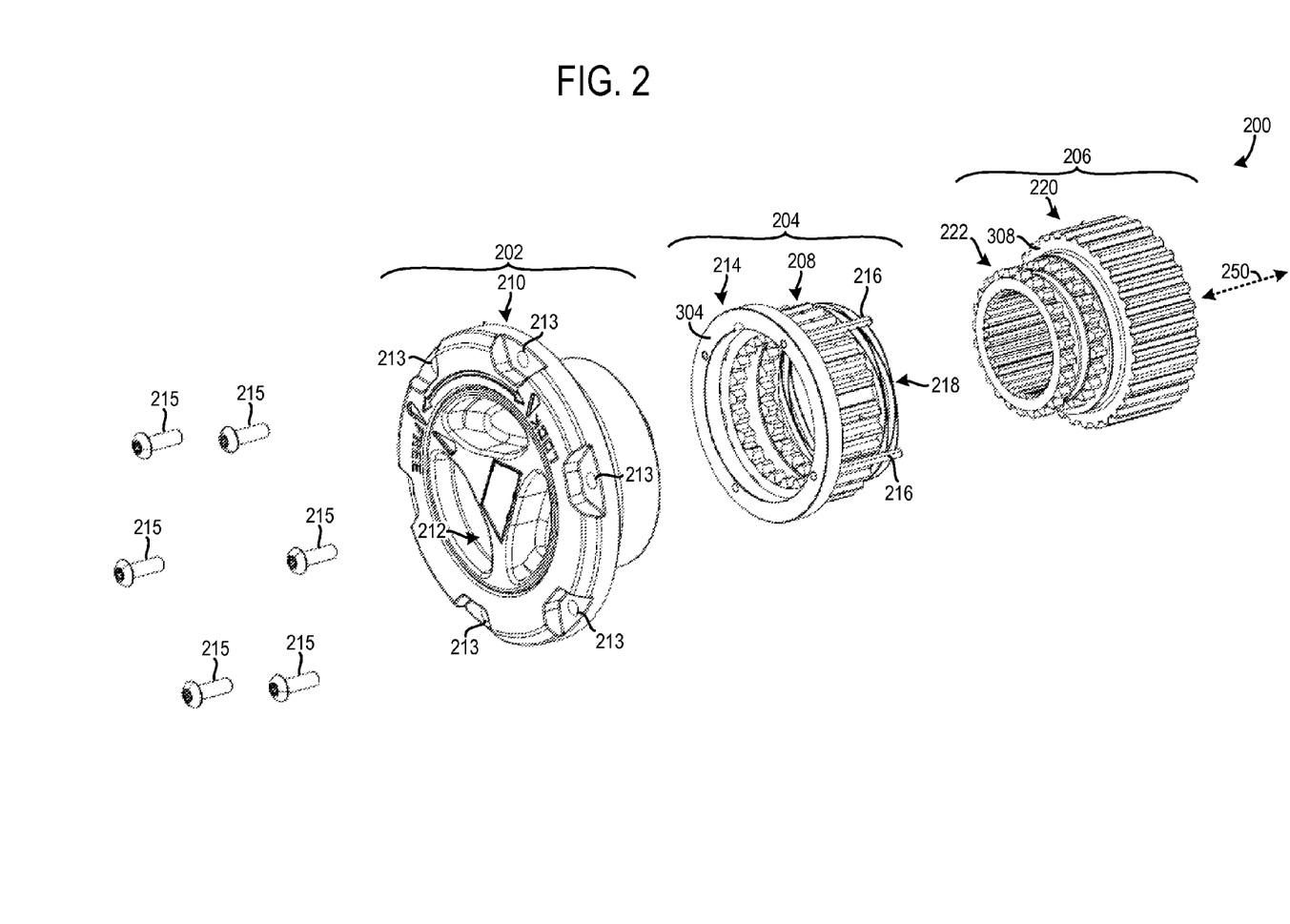
FIGS. 2 and 3 show exploded views of an exemplary locking hub system.

FIG. 2 shows an exploded view of an exemplary locking hub system 200. It will be appreciated that the locking hub system 200 may be utilized in the vehicle 10 shown in FIG. 1. Therefore, the locking hub system 200 is an example of one of the locking hub systems 32 shown in FIG. 1. Continuing with FIG. 2, the locking hub system 200 includes a cap assembly 202, a clutch ring assembly 204, and an inner drive gear assembly 206. The cap assembly 202 is configured to slidably actuate the clutch ring assembly 204 in response to input (e.g., rotational input) for a user. In this way, the locking hub system can be manually actuated. The cap assembly 202 is configured to attach to a wheel in the vehicle, such as one of the wheels 38, shown in FIG. 1.

Continuing with FIG. 2, the clutch ring assembly 204 can be actuated into two configurations, an engaged configuration and a disengaged configuration. In the engaged configuration splines in clutch ring assembly as well as the inner drive gear assembly are mated to enable rotational input to be transferred from the inner drive gear assembly to the clutch ring assembly. In this way, components in the inner drive gear assembly and the clutch ring assembly can jointly rotate. It will be appreciated that an axle provides the rotational input to the inner drive gear assembly, such as the one of the axles 30, shown in FIG. 1. As such, the rotational input from the axle coupled to the inner drive gear assembly 206 may be transferred to the wheel attached to the cap assembly 202 when the clutch ring assembly 204 is in the engaged configuration.

Continuing with FIG. 2, in the disengaged configuration the inner drive gear assembly 206 is decoupled from the clutch ring assembly 204. Specifically, a portion of the inner drive gear assembly 206 is configured to freely and independently rotate with regard to a clutch ring 208 included in the clutch ring assembly 204. The engaged/disengaged configuration provides hub locking and unlocking functionality which enables four-wheel drives capabilities in the vehicle to be enabled and disabled.

The cap assembly 202 includes a cap 210 and a dial 212. It will be appreciated that a user may manually actuate the dial 212. Specifically, the user may rotate the dial. As illustrated, the cap assembly 202 includes bolt openings configured to accept bolts extending therethrough and configured to attach to threaded openings in a wheel attachment interface. However, other types of suitable attachment apparatuses may be used to attach the cap assembly to a wheel. The cap 210 includes bolt openings 213. When the locking hub system 200 is assembled bolts 215 extend through the bolt openings 213 attaching the system to a wheel attachment interface, such as wheel attachment interface 36, shown in FIG. 1.

Continuing with FIG. 2, the clutch ring assembly 204 includes a pin ring 214 having a plurality of cantilevered pins 216 extending therefrom. There is an even number of cantilevered pins 216 in the depicted example. Furthermore, consecutive cantilevered pins have a 90 degree separation with respect to the central axis 250. However, an alternate number of cantilevered pins and/or pin spacing may be used, in other examples. For example, there may be five or three pins 216 evenly distributed around a circumference of the pin ring 214. The clutch ring assembly 204 further includes the clutch ring 208 and a return spring 218. The return spring 218 is a wave spring in the depicted example. However, other types of springs have been contemplated. The inner drive gear assembly 206 includes a bearing housing 220 and a drive gear 222. The drive gear 222 receives rotational input from an axle, such as one of the axles 30, shown in FIG. 1. The drive gear rotates about a central axis 250, which is common to all the components in the locking hub system 200. The central axis 250 may be a rotational axis of the locking hub system 200. Additionally, when the locking hub system 200 is in an assembled state at least a portion of the drive gear 222 is enclosed by the clutch ring 208.

The components in the clutch ring assembly 204 and/or the inner drive gear assembly 206 may be constructed out of a metal such as steel (e.g., 4140 steel). Specifically in one example, the components in the clutch ring assembly 204 and/or the inner drive gear assembly 206 may be solely constructed out of metal. It will be appreciated the constructing the clutch ring assembly and the inner drive gear assembly out of metal components increases the strength and durability of the locking hub system when compared to locking hubs utilizing plastic components.

Figure 3:
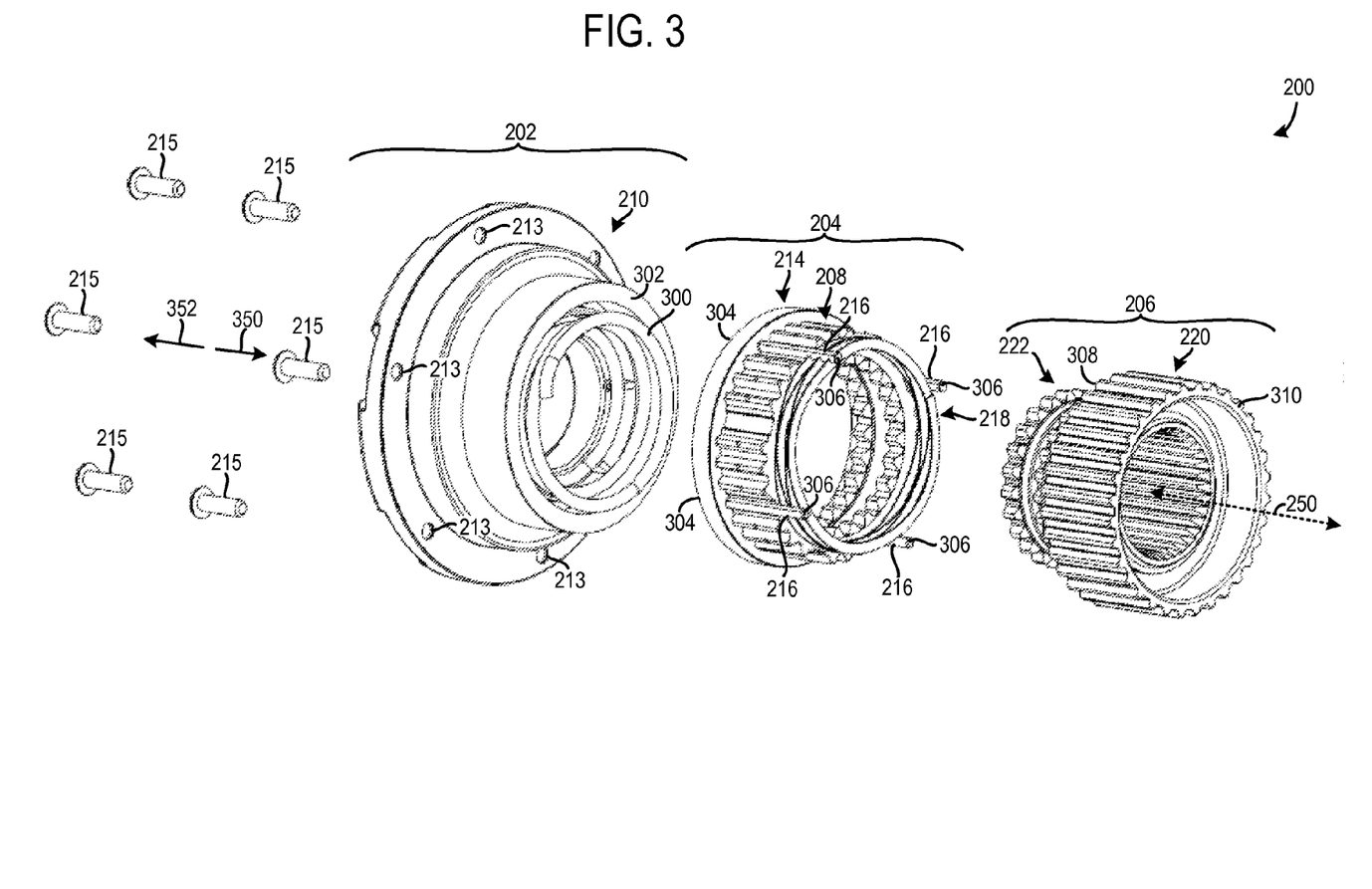

FIG. 3 shows another exploded view of the locking hub system 200 shown in FIG. 2. As illustrated, the plurality of cantilevered pins 216 in the pin ring 214 partially enclose the return spring 218 and the clutch ring 208. Each of the pins 216 of the pin ring 214 extend from a ring portion of the pin ring 214 and toward the inner drive gear assembly 206. In this way, the pin extensions (e.g., pins) of the pin ring 214 guide the movement of the return spring 218 and the clutch ring 208. It will be appreciated that when the pin ring 214 includes an open end facilitated via the cantilevering of the pins 216 the return spring 218 and clutch ring 208 can be easily removed from the clutch ring assembly 204 during disassembly.

As illustrated, the cap assembly 202 includes a compression spring 300 partially enclosed (e.g., circumferentially enclosed) by the cap 210. The pin ring 214 also partially encloses (e.g., circumferentially encloses) the compression spring 300 when the locking hub system is in an assembled state.

The cap 210 includes an inward surface 302. The inward surface 302 is radially aligned and planar and therefore is perpendicular to the central axis 250. However, other surface geometries have been contemplated. Additionally, the pin ring 214 has an outward surface 304. The outward surface 304 is also denoted in FIG. 2. In the depicted example, the outward surface 304 is radially aligned and planar and therefore is perpendicular to the central axis 250. However, other surface geometries have been contemplated. Additionally, the outward surface 304 is adjacent to (e.g., in face sharing contact with) the inward surface 302 in the cap 210. Thus, the inward surface 302 axially limits the movement of the pin ring assembly in an outward direction away from an axle. In this way, the inward surface 302 acts as a stop for the pin ring assembly 204. When the movement of the pin ring assembly is limited in this way the longevity of the locking hub system is increased when compared to other locking hub system which have floating components. It will be appreciated that an inward direction as described herein is a direction extending toward a vehicle axle and an outward direction is a direction extending away from a vehicle axle and toward an outer surface of the cap 210. Arrow 350 denotes an inward direction and arrow 352 denotes an outward direction.

Furthermore, each of the cantilevered pins 216 of the pin ring 214 includes an unsupported end 306. For example, each pin 216 of the pin ring 214 includes a first end coupled to an inward surface of the ring portion of the pin ring 214, the inward surface directly coupled to the clutch ring. Additionally, each pin 216 includes a second end, the second end being the unsupported end 306. When the locking hub system 200 is assembled the unsupported end 306 is adjacent to (e.g., in face sharing contact with) an outward surface 308 in the bearing housing 220. The outward surface 308 is also indicated in FIG. 2. It will be appreciated that the outward surface 308 circumferentially encloses the drive gear 222. In this way, the outward surface 308 of the bearing housing acts as a stop for the pin ring 214. As such, the outer surface 308 limits axial movement of the pin ring 214. Thus, the pin ring 214 is positioned between and axial movement of the pin ring 214 is limited by the inward surface 302 of the cap 210 and the outward surface 308 of the bearing housing 220.

The bolts 215 and bolt openings 213 are also depicted in FIG. 3. The bearing housing 220 also includes an inward surface 310. The inward surface 310 may be adjacent to an outer race of a wheel bearing. In this way, movement of another portion of the system is again axially limited, preventing unwanted movement of components in the system and further increasing the durability of the system.

Figure 4:
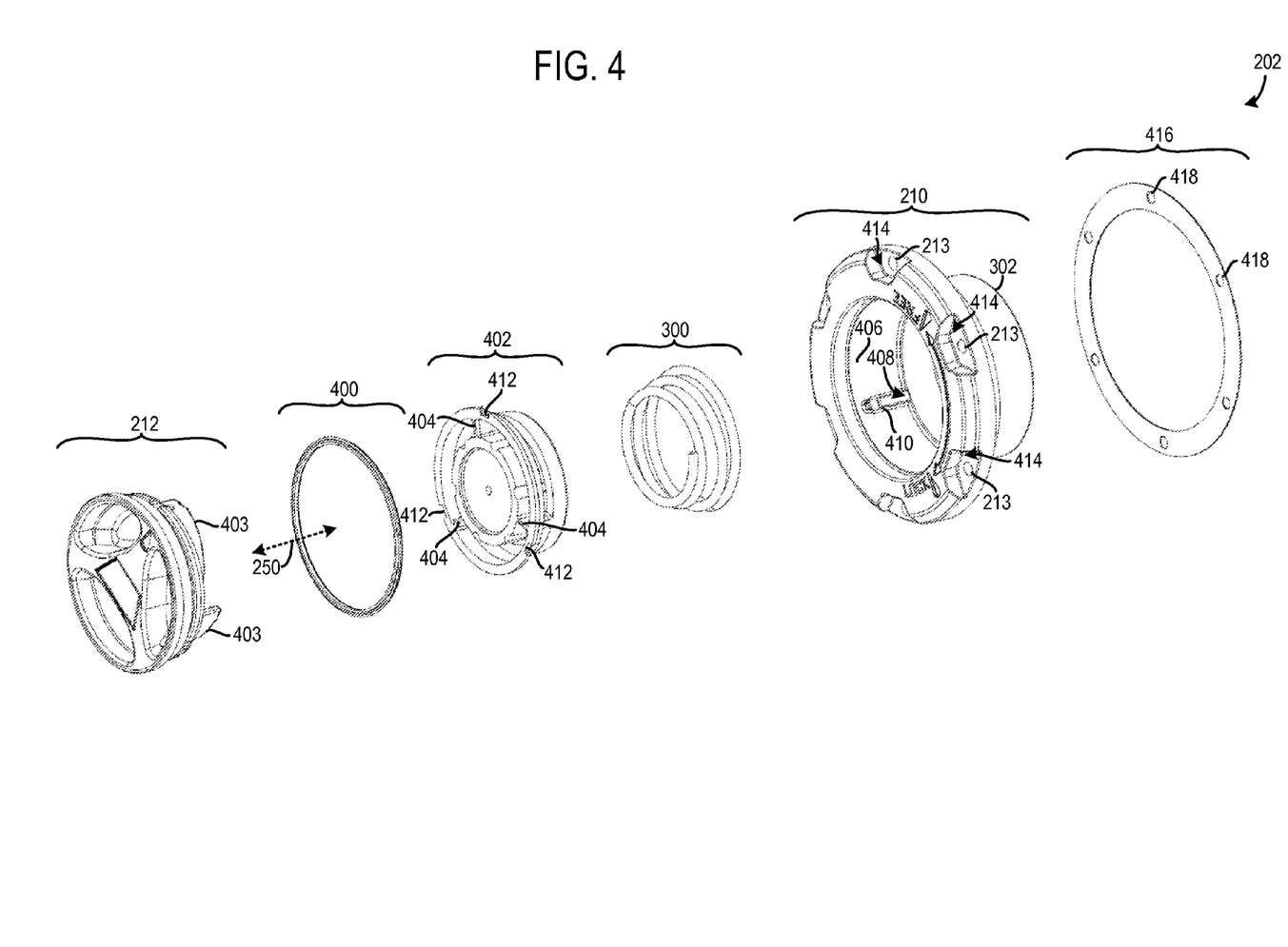
FIG. 4 shows an exploded view of a cap assembly included in the locking hub system illustrated in FIGS. 2 and 3.

FIG. 4 shows an exploded view of the cap assembly 202. The dial 212 in the cap assembly 202 is again illustrated. Additionally, a dial seal 400 is also depicted. The dial seal 400 is configured to provide sealing between the cap 210 and the dial 212. The cap assembly 202 further includes a dial nut 402.

The dial 212 may rotate about the central axis 250 when a user provides manual rotational input. Ramped surfaces 403 in the dial 212 interact with walls 404 in the dial nut 402 to translate rotational input into an axial force exerted on the compression spring 300. For example, the ramped surfaces 403 each include a ramped profile that extends further outward from the dial along a length of the ramped profile. As such, as the dial 212 is rotated, the ramped surfaces 403 may be rotated from a lower profile contact point contacting the walls 404 to a higher profile contact point contacting the walls 404, thereby pushing the dial nut 402 inward toward the axle. It will be appreciated that the cap assembly 202 enables a rotational input to be translated into an axial output force which is exerted on the pin ring assembly 204, discussed in greater detail herein with regard to FIG. 5.

Additionally, the compression spring 300 may be at least partially enclosed by a portion of the dial nut to retain the compression spring 300. When the cap assembly 202 is in an assembled state the cap 210 at least partially circumferentially encloses the dial 212, dial seal 400, dial nut 402, and the compression spring 300. Thus, an inner periphery 406 of the cap defines a boundary of an opening 408 where the dial 212, dial nut 402, and compression spring 300 are inserted when the cap assembly is assembled. The cap 210 further includes tracks 410 configured to mate with recesses 412 in the dial nut 402. The tracks 410 guide the axial movement of the dial nut 402 when the cap assembly 202 is actuated (e.g., manually actuated). As such, the dial nut 402 may slide axially along a length of the tracks 410.

The cap 210 further includes recesses 414 adjacent to the bolt openings 213. The recesses 414 may allow for a top the bolts positioned within the bolt openings 213 to not extend past an outer surface of the cap 210. As such, the recesses 414 may each have a depth greater than a height of a bolt head. A gasket cap 416 is also included in the cap assembly 202 which provides sealing between the cap 210 and a portion of a wheel. The gasket cap 416 includes openings 418 which align with the bolt openings 213 when the cap assembly 202 is assembled. However, other gasket cap configurations may be used. The inward surface 302 of the cap 210 is also shown in FIG. 4.

In one example, the cap 210 may be constructed out of metal. Specifically, in one example, the cap 210 may be solely constructed out of metal. The compression spring 300 may also be constructed out of metal. On the other hand, the dial 212 and dial nut 402 may be constructed out of a plastic material in one example. However, other material constructions may be utilized. For instance, the dial and dial nut may be constructed out of metal.

Figure 5:
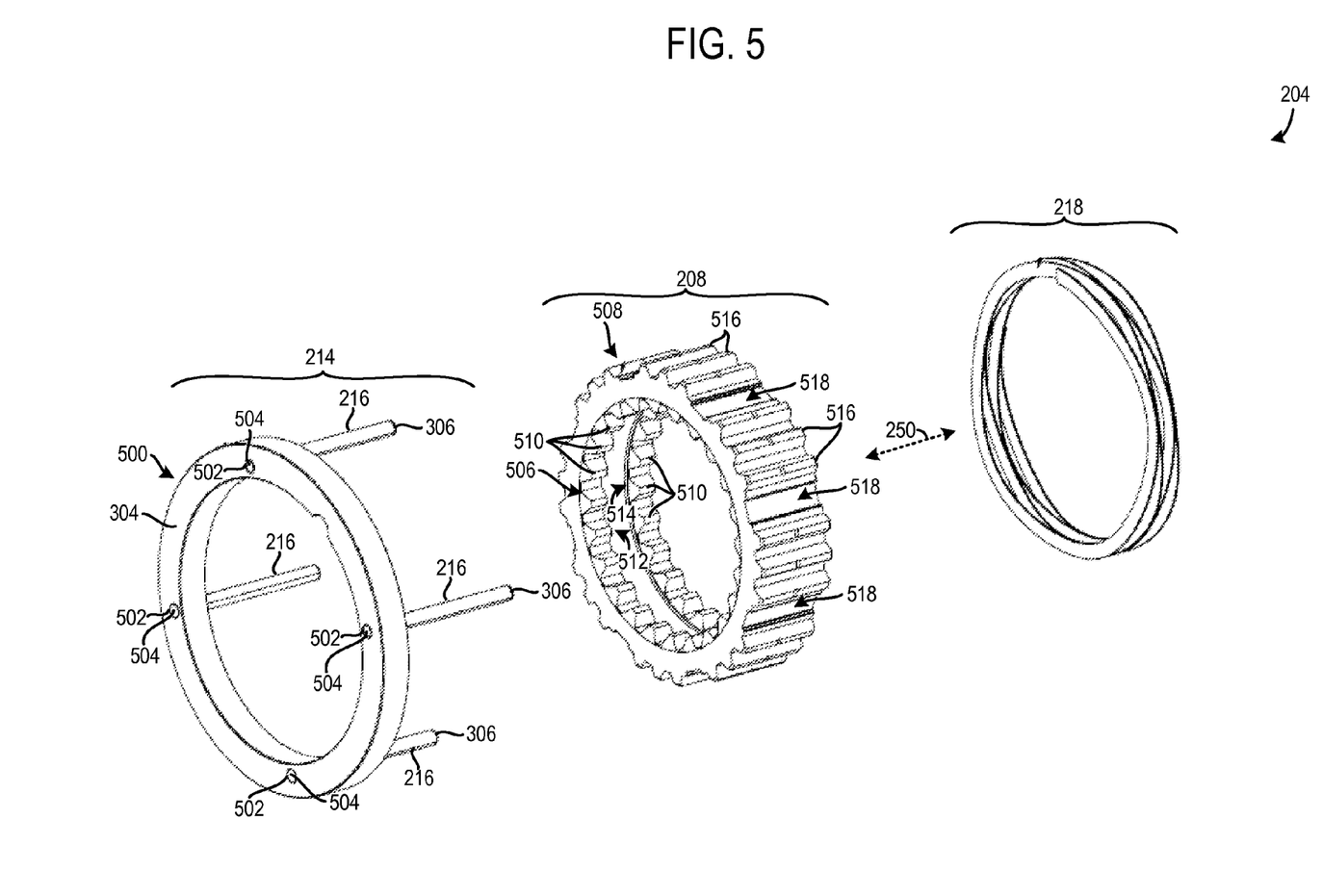
FIG. 5 shows an exploded view of a clutch ring assembly included in the locking hub system illustrated in FIGS. 2 and 3.

FIG. 5 shows an exploded view of the pin ring assembly 204. The pin ring assembly 204 includes the pin ring 214 having a support ring 500 including a plurality of cantilevered pins 216 extending therefrom. The unsupported ends 306 of the cantilevered pins 216 are again shown. The support ring 500 has an annular geometry. Additionally, the support ring 500 includes the outward surface 304. As previously discussed, the outward surface 304 is adjacent to (e.g., in face sharing contact with) the inward surface 302 in the cap 210, shown in FIG. 4. Thus, the inward surface 302 axially limits the movement of the pin ring assembly in an outward direction. The cantilevered pins 216 have a cylindrical geometry in the depicted example. However, other pin geometries have been contemplated.

Continuing with FIG. 5, the plurality of cantilevered pins 216 are coupled to the support ring 500. Specifically, the cantilevered pins 216 extend into openings 502 in the support ring and are welded thereto. Thus, the supported ends 504 of the cantilevered pins 216 are coupled to the support ring 500. However, other suitable coupling techniques between the support ring 500 and the cantilevered pins 216 have been contemplated. For instance, the pin ring may be cast.

The clutch ring 208 and the return spring 218 are also depicted in FIG. 5. In an assembled configuration the clutch ring 208 and the return spring 218 are at least partially enclosed (e.g., partially circumferentially enclosed) by the pin ring 214 and specifically the cantilevered pins 216 in the pin ring. Therefore, pin ring 214 axially guides the movement of the clutch ring 208 and the return spring 218. In one example, a length of each pin 216 is based on length (in the axial direction) of the clutch ring and return spring such that the length of each pin 216 extends along a length of the clutch ring 208 and the return spring 218 when the clutch ring assembly is in its assembled configuration.

The return spring 218 is a wave spring in the depicted example. However, other types of springs may be used in the pin ring assembly 204, in other examples. The return spring is 218 positioned between the clutch ring 208 and the bearing housing 220, shown in FIG. 3. Continuing with FIG. 5, the return spring 218 is partially compressed when the locking hub system is in an assembled state. Thus, the return spring 218 is configured to exert an axial force in an outward direction on the clutch ring 208.

The clutch ring 208 includes a clutch ring interior splined surface 506 and a clutch ring exterior splined surface 508. The interior splined surface 506 includes a plurality of splines 510 extending 360 degrees around the central axis 250. Specifically, in the depicted example, the interior splined surface 506 includes a first sent of splines 512 and a second set of splines 514 spaced apart from one another and at opposite ends of the clutch ring 208. The second set of splines 514 is positioned inward with respect to the first set of splines 512. The splines in the clutch ring interior splined surface 508 are configured to mate with splines in the drive gear 222, shown in FIG. 6, in an engaged configuration of the locking hub system.

Figure 6:
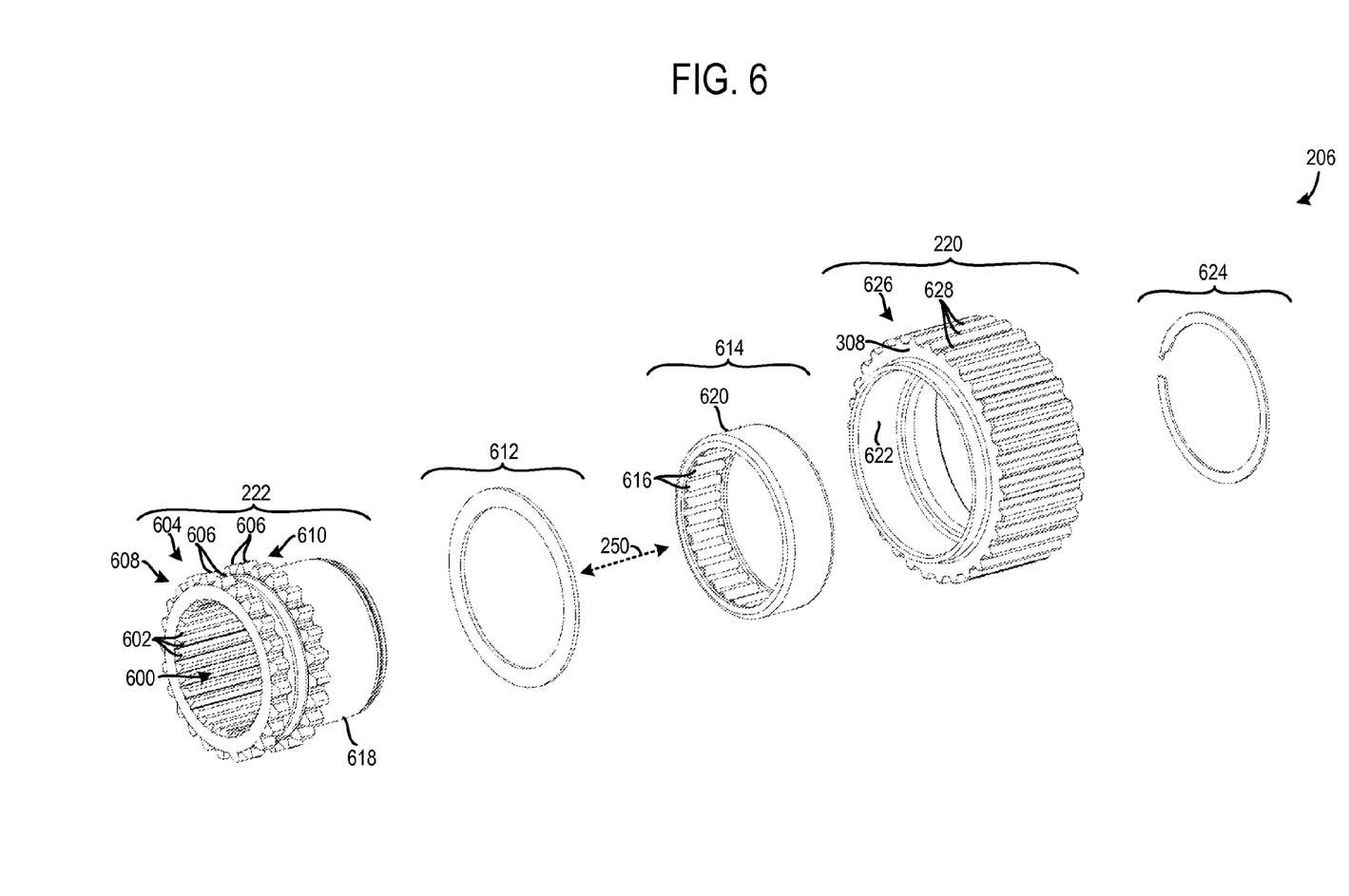
FIG. 6 shows an exploded view of an inner drive gear assembly included in the locking hub system illustrated in FIGS. 2 and 3.
Figure 9:
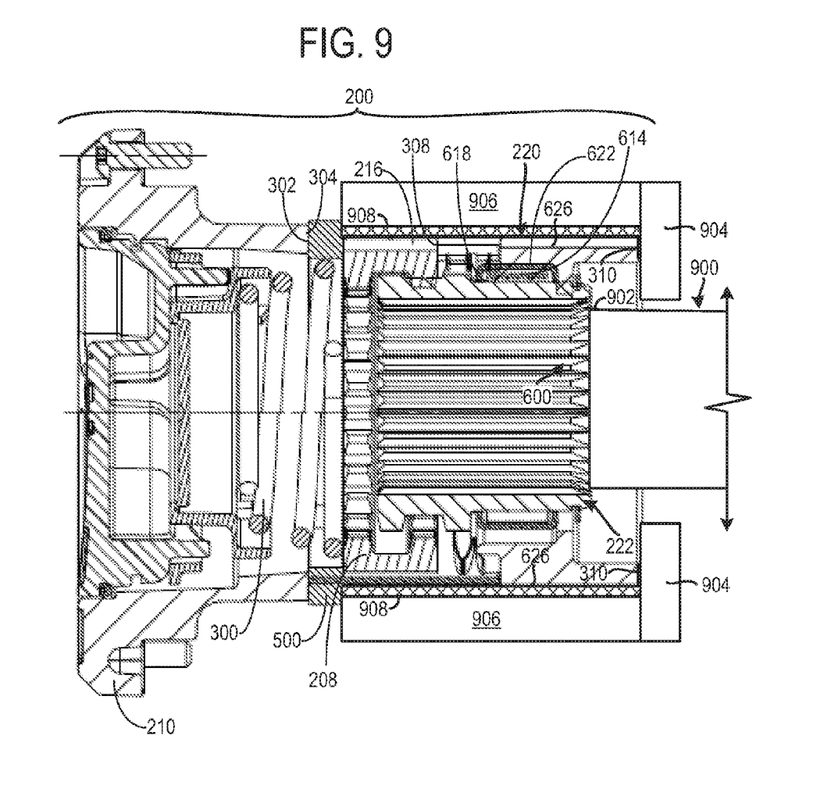
FIG. 9 shows a cross-sectional view of the assembled locking hub system illustrated in FIGS. 7 and 8.

The clutch ring exterior splined surface 508, shown in FIG. 6, includes a plurality of splines 516 and is configured to mate with a wheel attachment interface 906 in a vehicle wheel assembly, shown in FIG. 9 discussed in greater detail herein. Additionally, the exterior splined surface 508 includes gaps 518. The gaps 518 may be configured to receive the pins 216 when the pin ring assembly is assembled. Thus, the pins 216 may extend through the gaps 518 when the pin ring assembly is assembled. Further, the clutch ring 208 may include a same number of gaps 518 as the number of pins 216, each pin 216 positioned within a corresponding gap 518. In one example, a thickness of the pins 216 may determine a width of each gap 518. As such, thinner pins 216 may allow for smaller gaps 518, thereby allowing for more splines 516 and a stronger clutch ring 208.

FIG. 6 shows an exploded view of the inner drive gear assembly 206. The inner drive gear assembly 206 includes the drive gear 222. The drive gear 222 includes an interior splined surface 600 configured to attach to (e.g., mate with) a splined surface in a vehicle axle, such as one of the vehicle axles 30, shown in FIG. 1. The interior splined surface 600 includes a plurality of splines 602 extending 360 degrees around the central axis 250. The drive gear 222 further includes a drive gear exterior splined surface 604 including a plurality of splines 606. Specifically, the exterior splined surface 604 includes a first set of splines 608 and a second set of splines 610 spaced apart from one another (along the central axis 250) and configured to mate with the first and second sets of splines (512 and 514) included in the clutch ring 208, shown in FIG. 5 when the locking hub system is in an engaged configuration. Likewise, the splined surfaces in the clutch ring 208 and the drive gear 222 may be axially offset when the locking hub system is in a disengaged configuration. For example, in the disengaged confirmation none of the splined surfaces of the clutch ring 208 and the drive gear 222 may mate with one another. In this way, the drive gear and clutch ring can be decoupled from one another enabling the drive gear to freely rotate.

The inner drive gear assembly 206 further includes a thrust washer 612 positioned between the drive gear 222 and a bearing 614 (e.g., roller bearing). The bearing 614 including cylindrical rollers 616, in the depicted example. An external cylindrical surface 618 of the drive gear 222 is configured to contact the rollers 616 when the inner drive gear assembly 206 is assembled. Thus, the bearing 614 enables rotation of the drive gear 222 about the central axis 250. In other words, the bearing 614 is rotationally coupled to the drive gear 222. The bearing 614 further includes an outer race 620 which is positioned in and fixedly coupled to the bearing housing 220 when the inner drive gear assembly 206 is assembled. In particular, the outer race 620 may be in face sharing contact with an interior surface 622 of the bearing housing 220. A snap ring 624 may also be provided to retain the bearing 614 in the bearing housing 220. It will be appreciated that a user can easily remove the snap ring during servicing (e.g., cleaning and re-greasing), replacement, or repair of the locking hub system.

The bearing housing 220 further includes a bearing housing exterior splined surface 626 including a plurality of splines 628. It will be appreciated that each of the splines has a similar size and geometry in the depicted examples. As shown, the exterior splined surface 626 extends 360 degrees around the central axis 250 where consecutive splines are equidistantly spaced. In this way, greater coupling strength is provided between the splined surface 626 and the wheel attachment interface 906, shown in FIG. 9, discussed in greater detail herein. However, in other examples the exterior splined surface 626 may include gaps in the splines. Additionally, the exterior splined surface 626 spans the axial with of the bearing housing 220. However in other example, the splined surface may only axially extend across a portion of the bearing housing.

The outward surface 308 of the bearing housing 220 is also shown in FIG. 6. It will be appreciated that the unsupported ends 306 of the cantilevered pins 216 shown in FIG. 5 may be adjacent to the outward surface 308 when the locking hub system is assembled.

Figure 7:
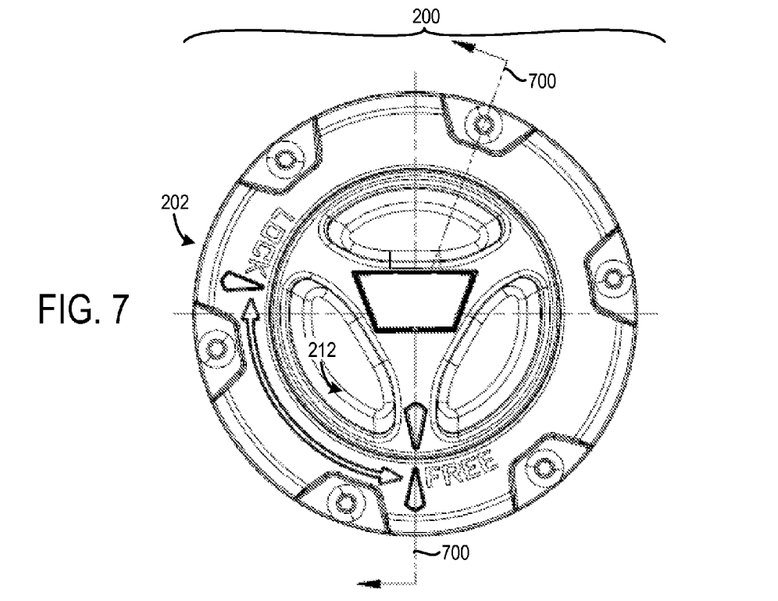
FIG. 7 shows a front view the locking hub system, shown in FIGS. 2 and 3, in an assembled state.

FIG. 7 shows a front view of the assembled locking hub system 200. Specifically, the dial 212 in the cap assembly 202 is shown in FIG. 7. Cutting plane 700 defines the cross-sectional view shown in FIG. 9.

Figure 8:
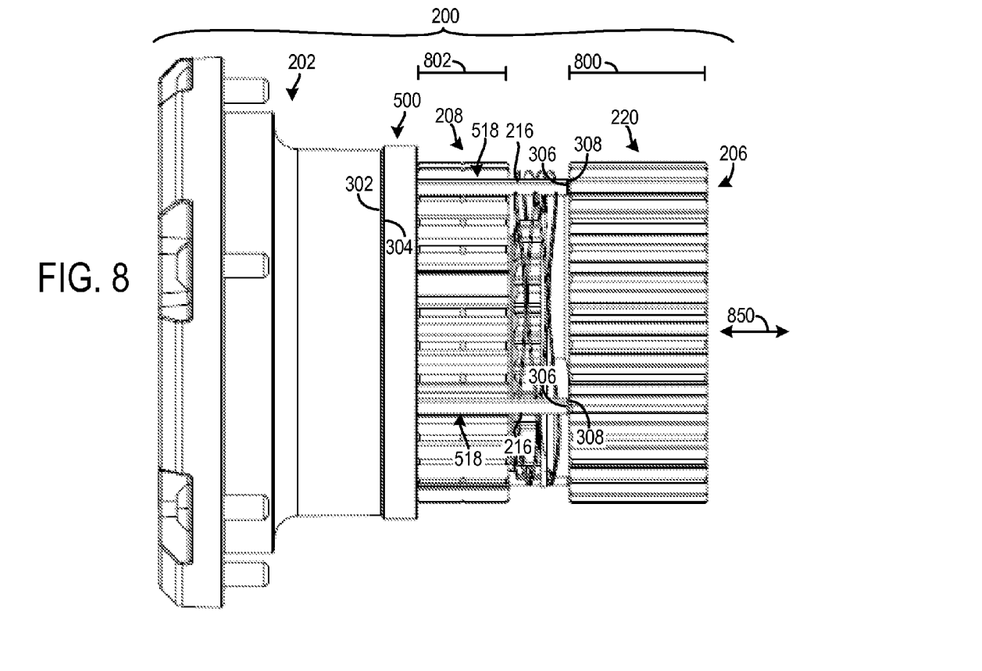
FIG. 8 shows a side view the locking hub system, illustrated in FIGS. 2 and 3, in an assembled state.

FIG. 8 shows a side view of the assembled locking hub system 200. The bearing housing 220 and the clutch ring 208 are illustrated. An axial width 800 of the bearing housing 220 is greater than an axial width 802 of the clutch ring 208. However, other proportionalities between the clutch ring and the bearing housing may be used in other examples. Additionally, the inward surface 302 of the cap 210 is adjacent to (e.g., in face sharing contact with) the outward surface 304 of the support ring 500. The cantilevered pins 216 are shown extending through the gaps 518 in the clutch ring 208. Additionally, the unsupported ends 306 of the cantilevered pins 216 are adjacent to the outward surface 308 of the bearing housing 220. For example, the unsupported ends 306 are positioned against and in face-sharing contact with the outward surface 308 of the bearing housing 220. As previously discussed, the cap assembly 202 is configured to actuate the clutch ring 208 slidably moving (e.g., shifting) the clutch ring in an axial inward and axial outward direction, denoted by arrow 850. The movement of the clutch ring 208 relative to the inner drive gear assembly 206 enables engagement/disengagement of these components.

FIG. 9 shows a cross-sectional view of the assembled locking hub system 200. As shown, the interior splined surface 600 of the drive gear 222 is attached to an axle 900. Specifically in one example, the interior splined surface 600 may be mated with a splined surface 902 in the axle 900. Additionally, the inward surface 310 of the bearing housing 220 is adjacent to (e.g., in face sharing contact with) a wheel bearing outer race 904 (e.g., wheel bearing outer race). Additionally, the exterior splined surface 626 of the bearing housing is mated with a splined surface 908 in a wheel attachment interface 906.

Also shown in FIG. 9, the outward surface 308 of the bearing housing 220 is adjacent to and in face sharing contact with the unsupported ends 306 of the pins 216 of the pin ring 214. The support ring 500 of the pin ring 214 held between the bearing housing 220 and the cap 210. More specifically, the inward surface 302 of the cap 210 is in face sharing contact with the outward surface 304 of the pin ring 214. As such, the inward surface 302 or the cap 210 holds the pin ring 214 axially against the bearing housing 220.

As introduced above, the components of the clutch ring assembly 204 are not fixedly coupled to one another (e.g., not fastened or screwed together). Instead, the pins 216 of the pin ring 214 hold the clutch ring 208 and the return spring 218 together with the pin ring 214 only when the cap 210 is positioned against the pin ring, thereby positioning the unsupported ends 306 of the pins against the outward surface 308 of the bearing housing 220. Said another way, the pin ring 214, clutch ring 208, and return spring 218 are not fixedly coupled between the cap assembly 202 and the bearing housing 220 except for when the cap 210 is assembled with the rest of the locking hub system 200. Thus, when the cap 210 is removed from the rest of the assembly, the pin ring 214 is not held in place. As such, the pin ring 214 may move axially outward and away from the axle and inner drive gear assembly 206. Further, once the ping ring 214 is removed from the assembly, the clutch ring 208 and then the return spring 218 may be removed individually from the locking hub system. In this way, the individual parts of the clutch ring assembly 204 may be removed separately and/or accessed for cleaning, maintenance, and/or replacement. If these components of the clutch ring assembly were rigidly coupled to one another, the ease of removal, servicing, and cleaning may be reduced.

In this way, a locking hub assembly may be a modular assembly including a cap assembly, clutch ring assembly, and inner drive gear assembly. The clutch ring assembly may include a pin ring, clutch ring, and return spring that all may be separated from one another for easy servicing, cleaning, and/or replacement. By including a pin ring having a plurality of pins surrounding the clutch ring, movement of the clutch ring and return spring may be limited to the axial direction, thereby reducing component wear. Further, by utilizing a finite number of pins spaced approximately equally around a circumference of the pin ring, the pins may reduce non-axial movement with a smaller number of pins. For example, reducing the number of pins four pins allows for sufficient constraint of radial movement while allowing for less pin gaps in the clutch ring. A reduced number of pin gaps of the clutch ring allows for additional splines in the clutch ring, thereby increasing the coupling strength between the clutch ring and wheel attachment interface. Further, an inward surface of the cap assembly and an outward surface of the bearing housing serve as stops constraining the axial movement of the pin ring. As such, axial movement of the clutch ring toward the cap assembly and/or inner drive gear assembly is limited without needing additional stop components.

As one embodiment, a locking hub system in a vehicle comprises an inner drive gear assembly including a drive gear having a drive gear interior splined surface configured to attach to an axle and a bearing housing rotationally coupled to the drive gear having a bearing housing exterior splined surface configured to mate with a wheel attachment interface. The system further comprises a clutch ring assembly including a pin ring having a plurality of cantilevered pins extending from a support ring and partially enclosing a clutch ring and unsupported at one end, the clutch ring including a clutch ring splined interior surface slidably moveable to mate with a drive gear splined exterior surface of the drive gear in an engaged configuration providing joint rotational movement of the drive gear and the clutch ring and slidably moveable to decouple from the drive gear splined exterior surface in a disengaged configuration providing independent rotation of the drive gear from the clutch ring. The system further comprises a cap assembly configured to actuate the clutch ring assembly in the engaged and disengaged configurations in response to manual input.

It will be appreciated that the configurations disclosed herein are exemplary in nature, and that these specific examples are not to be considered in a limiting sense, because numerous variations are possible. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A locking hub system in a vehicle comprising:
an inner drive gear assembly including a drive gear having a drive gear interior splined surface configured to attach to a vehicle axle, a bearing contacting and positioned around an external cylindrical surface of the drive gear, and a bearing housing fixedly coupled to and positioned around the bearing, the bearing housing having a bearing housing exterior splined surface around a circumference of the bearing housing and configured to mate with a splined surface of a wheel attachment interface; and
a clutch ring assembly including a pin ring comprising an annular support ring and a plurality of cantilevered pins extending from an inward surface of the support ring and toward the bearing housing, partially enclosing a clutch ring, and unsupported at one end, the clutch ring including a clutch ring splined interior surface slidably moveable to mate with a drive gear splined exterior surface of the drive gear in an engaged configuration and slidably moveable to decouple from the drive gear splined exterior surface in a disengaged configuration.

2. The locking hub system of claim 1, further comprising a cap assembly configured to actuate the clutch ring assembly into the engaged and disengaged configurations in response to manual input.

3. The locking hub system of claim 2, where the position of the clutch ring relative to the drive gear is axially shifted in response to the manual input.

4. The locking hub system of claim 2, where the support ring of the pin ring includes an outward surface, and where the outward surface of the pin ring is in face sharing contact with an inward surface in the cap assembly and the unsupported ends of the plurality of cantilevered pins are in face sharing contact with an outward surface of the bearing housing when the clutch ring is in both the engaged configuration and the disengaged configuration.

5. The locking hub system of claim 1, where the bearing housing exterior splined surface extends 360 degrees around the bearing housing and includes a plurality of splines, where consecutive splines are equidistantly spaced.

6. The locking hub system of claim 1, where the unsupported ends of the plurality of cantilevered pins are in face sharing contact with an outward surface of the bearing housing.

7. The locking hub system of claim 1, where the pin ring includes an even number of cantilevered pins positioned substantially evenly around a circumference of the pin ring.

8. The locking hub system of claim 1, where an axial width of the bearing housing is greater than an axial width of the pin ring and where the clutch ring assembly and the drive gear are constructed out of metal.

9. The locking hub system of claim 1, where an inward surface of the bearing housing is in face sharing contact with a wheel bearing outer race.

10. The locking hub system of claim 1, where the bearing is a roller bearing including an outer race fixedly coupled to the bearing housing and a plurality of rollers contacting the external cylindrical surface of the drive gear.

11. The locking hub system of claim 2, where the pin ring is positioned between and in face sharing contact with each of an inward surface of the cap assembly and an outward surface of the bearing housing when the clutch ring is in both the engaged configuration and the disengaged configuration.

12. A locking hub system comprising:
an inner drive gear assembly including a drive gear having a drive gear interior splined surface configured to attach to an axle and a bearing housing coupled to the drive gear via a roller bearing, the bearing housing having a bearing housing exterior splined surface configured to mate with a splined surface of a wheel attachment interface;
a clutch ring assembly including a pin ring having a plurality of cantilevered pins extending from an inward surface of a support ring of the pin ring and toward the bearing housing, the plurality of cantilevered pins partially enclosing a clutch ring and unsupported at one end, where a first end of each pin of the plurality of cantilevered pins is directly coupled to the inward surface of the support ring and a second end of each pin is in face sharing contact with an outward surface of the bearing housing, and where the clutch ring includes a clutch ring splined interior surface slidably moveable to mate with a drive gear splined exterior surface of the drive gear in an engaged configuration providing joint rotational movement of the drive gear and the clutch ring and slidably moveable to decouple from the drive gear splined exterior surface in a disengaged configuration providing independent rotation of the drive gear from the clutch ring; and
a cap assembly including a dial arranged within a cap including an inward surface, where the cap assembly is configured to actuate the clutch ring into the engaged configuration and disengaged configuration in response to manual input via the dial, and where in both the engaged configuration and disengaged configuration, an outward surface of the support ring of the pin ring is in face sharing contact with the inward surface of the cap and the second end of each pin is in face sharing contact with the outward surface of the bearing housing.

13. The locking hub system of claim 12, where the pin ring is constructed out of metal.

14. The locking hub system of claim 12, where an axial width of the bearing housing is greater than an axial width of the drive gear.

15. The locking hub system of claim 12, where the roller bearing includes an outer race fixedly coupled to an interior surface of the bearing housing and a plurality of rollers in contact with an external cylindrical surface of the drive gear.

16. The locking hub system of claim 12, where an inward surface of the bearing housing is in face sharing contact with a wheel bearing outer race.

17. A locking hub system in a vehicle comprising:
a clutch ring assembly including a pin ring having a plurality of cantilevered pins extending from a support ring and toward an inner drive gear assembly, where the plurality of cantilevered pins partially encloses a clutch ring, the pin ring positioned against and between each of an outward surface of a bearing housing of the inner drive gear assembly and an inward surface of a cap of a cap assembly of the locking hub system when the clutch ring is both engaged and disengaged with the inner drive gear assembly, the pin ring only held axially inward toward an axle by the cap assembly, the clutch ring held inward toward the axle by an inward surface of the support ring of the pin ring, the inner drive gear assembly coupled to the axle.

18. The locking hub system of claim 17, where the inner drive gear assembly includes a drive gear having a drive gear interior splined surface configured to attach to the axle, where the bearing housing is rotationally coupled to the drive gear and has a bearing housing exterior splined surface configured to mate with a wheel attachment interface, and where the clutch ring includes a clutch ring splined interior surface slideably moveable to mate with a drive gear splined exterior surface of the drive gear in an engaged configuration providing joint rotational movement of the drive gear and the clutch ring and slidably moveable to decouple from the drive gear splined exterior surface in a disengaged configuration providing independent rotation of the drive gear from the clutch ring.

19. The locking hub system of claim 18, where the clutch ring includes an outward surface in face sharing contact with the inward surface of the cap in the cap assembly, where unsupported ends of the plurality of cantilevered pins do not axially extend between splines in the bearing housing exterior splined surface, and where the cap assembly is configured to actuate the clutch ring assembly in the engaged and disengaged configurations in response to manual input.

20. The locking hub system of claim 18, where an axial width of the bearing housing is greater than an axial width of the pin ring.

* * * * *